United States Patent
Ni et al.

(10) Patent No.: US 12,411,552 B2
(45) Date of Patent: Sep. 9, 2025

(54) SENSING APPARATUS, ELECTRONIC DEVICE, AND CONTROL METHOD FOR ELECTRONIC DEVICE

(71) Applicant: HUAWEI TECHNOLOGIES CO., LTD., Guangdong (CN)

(72) Inventors: Gang Ni, Nanjing (CN); Tao Huang, Beijing (CN); Huimin Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 140 days.

(21) Appl. No.: 18/324,010

(22) Filed: May 25, 2023

(65) Prior Publication Data

US 2023/0297171 A1 Sep. 21, 2023

Related U.S. Application Data

(63) Continuation of application No. PCT/CN2020/132969, filed on Nov. 30, 2020.

(51) Int. Cl.
*G06F 3/01* (2006.01)
*G06F 3/04886* (2022.01)
(Continued)

(52) U.S. Cl.
CPC .............. *G06F 3/016* (2013.01); *G06F 3/011* (2013.01); *G06F 3/04886* (2013.01); *G09B 21/003* (2013.01)

(58) Field of Classification Search
CPC ... G06F 3/01; G06F 3/02; G06F 3/011; G06F 3/016; G06F 3/041; G06F 3/042;
(Continued)

(56) References Cited

U.S. PATENT DOCUMENTS

| | | | |
|---|---|---|---|
| 6,705,868 B1 | 3/2004 | Schleppenbach et al. | |
| 7,575,807 B1 * | 8/2009 | Barvosa-Carter | ....... F03G 7/065 428/411.1 |

(Continued)

FOREIGN PATENT DOCUMENTS

| | | |
|---|---|---|
| CN | 1903656 A | 1/2007 |
| CN | 104036672 A | 9/2014 |

(Continued)

OTHER PUBLICATIONS

Roberta L. Klatzky et al., Haptic object perception: spatial dimensionality and relation to vision, doi:10.1098/rstb.2011.0153, Nov. 12, 2011, 9 pages.

(Continued)

*Primary Examiner* — Chanh D Nguyen
*Assistant Examiner* — Nguyen H Truong
(74) *Attorney, Agent, or Firm* — WOMBLE BOND DICKINSON (US) LLP

(57) ABSTRACT

This application discloses a sensing apparatus, an electronic device, and a control method for the electronic device. The sensing apparatus includes a circuit board and a plurality of control points fixed to the circuit board, and each of the plurality of control points is located at a different position on the circuit board. Each control point includes memory alloy layers and elastic layers that are superposed and fixed in a one-to-one correspondence. When temperatures of all the memory alloy layers are lower than a specified threshold, all the memory alloy layers are located in a first plane. When a temperature of a specified memory alloy layer is higher than the specified threshold, the specified memory alloy layer is bent and deformed. Each memory alloy layer is connected to two electrodes for connecting the memory alloy layer to a circuit.

18 Claims, 10 Drawing Sheets

(51) Int. Cl.
  *G08B 6/00* (2006.01)
  *G09B 21/00* (2006.01)
(58) Field of Classification Search
  CPC .......... G06F 3/043; G06F 3/044; G06F 3/045;
    G06F 3/0414; G06F 3/0354; G06F
    3/0346; G06F 3/0481; G06F 3/0488;
    G06F 3/04886; G06F 1/16; G06F 19/00;
    G08B 6/00; G09B 21/003; G06K 19/07;
    G06K 19/077; B81B 3/00; B81B 7/04;
    H01M 2/02; H01M 6/04; H01M 6/14;
    G09G 5/00; H01H 51/52; H01H 37/46;
    H01H 37/52; H01H 61/06
  See application file for complete search history.

(56) References Cited

U.S. PATENT DOCUMENTS

| | | | |
|---|---|---|---|
| 2006/0038643 A1* | 2/2006 | Xu | G11C 23/00 335/78 |
| 2011/0301876 A1 | 12/2011 | Yamashita | |
| 2012/0105333 A1 | 5/2012 | Maschmeyer et al. | |
| 2012/0212442 A1* | 8/2012 | Uchida | G06F 3/016 345/173 |
| 2013/0127690 A1* | 5/2013 | Tsai | G02F 1/133382 345/55 |
| 2013/0141345 A1* | 6/2013 | Wang | H04M 1/0266 345/173 |
| 2016/0135286 A1* | 5/2016 | Hwang | H05K 5/0017 361/720 |
| 2017/0068318 A1 | 3/2017 | Mcclure et al. | |
| 2017/0269693 A1* | 9/2017 | Modarres | G06F 3/0412 |
| 2019/0355225 A1* | 11/2019 | Khoshkava | G06F 3/016 |
| 2019/0391649 A1* | 12/2019 | Heubel | G06F 3/041 |

FOREIGN PATENT DOCUMENTS

| | | |
|---|---|---|
| CN | 204204266 U | 3/2015 |
| CN | 109613973 A | 4/2019 |
| CN | 109733497 A | 5/2019 |
| CN | 211555246 U | 9/2020 |
| JP | H11219143 A | 8/1999 |
| JP | 2007048268 A | 2/2007 |
| JP | 2008262478 A | 10/2008 |
| JP | WO2011052484 A1 | 3/2013 |
| KR | 20140085734 A | 7/2014 |
| WO | 2018194884 A1 | 10/2018 |

OTHER PUBLICATIONS

M Ire Eithne O Neill, Corporeal Experience: A Haptic Way of Knowing, Journal of Architectural Education, Sep. 2001, 10 pages.

Tracy Packiam Alloway et al., The Roles of Thought and Experience in the Understanding of Spatio-temporal Metaphors, Proceedings of the Annual Meeting of the Cognitive Science Society, 2001, 7 pages.

* cited by examiner

SENSING APPARATUS, ELECTRONIC DEVICE, AND CONTROL METHOD FOR ELECTRONIC DEVICE

CROSS-REFERENCE TO RELATED APPLICATIONS

This application is a continuation of International Application No. PCT/CN2020/132969, filed on Nov. 30, 2020, the disclosure of which is hereby incorporated by reference in its entirety.

TECHNICAL FIELD

This application relates to the field of human-computer interaction technologies, and in particular, to a sensing apparatus, an electronic device, and a control method for the electronic device.

BACKGROUND

Information obtained by a human being is essentially a change in space (two-dimensional/three-dimensional) and time, including a character, a convex, and experience-type music, speed, and the like. Braille and Morse code are two typical manners of transmitting information by using a spatial shape and time variation. The braille has six fixed points, each point can be protruded or not protruded, to form information to be expressed. The Morse code is intermittent signal code, which uses different sequences to express different English letters, numbers, and punctuations.

Touch is a second vision of the human being, and the human being can sense and obtain information through skin touch. A common touch manner of obtaining information includes that a blind person obtains information by touching the Braille. In life, a substance can be directly recognized by touch, without visual and verbal prompts. When sticking a hand out of a window, the human being can feel a speed of a vehicle and a temperature.

In the field of human-computer interaction, people mainly focus on vision and hearing. However, with an improvement of computer performance, a research and an application of other sensory forms are becoming more important. At present, an information perception capability of touch is studied in the industry and academic circles, and information to be expressed can be abstracted by changing time and space dimensions of a touch perception.

All languages in the world can be expressed by limited factors, for example, all written and phonetic languages in the world can be represented by touch perceptible manners.

SUMMARY

This application provides a sensing apparatus, an electronic device, and a control method for the electronic device, to transmit information through touch, thereby enriching information transmission manners.

According to a first aspect, this application provides a sensing apparatus. The sensing apparatus includes a circuit board and a control point matrix fixed to the circuit board, a plurality of control points are arranged in the control point matrix, and each of the plurality of control points is located at a different position on the circuit board. In other words, the plurality of control points of the control point matrix are arranged in sequence. Each control point includes a memory alloy layer and an elastic layer, where the memory alloy layer is a memory alloy material and the elastic layer is a high-toughness material. The memory alloy layer and the elastic layer of each control point are superposed and fixed in a one-to-one correspondence. The memory alloy layer can be bent and deformed when a temperature rises, and the elastic layer is configured to drive the deformed memory alloy layer to recover an original shape. Specifically, when temperatures of all memory alloy layers are lower than a specified threshold, all the control points are located on a first plane, that is, in a non-operating state, all the control points are located on the first plane. When a temperature of a specified memory alloy layer is higher than the specified threshold, the specified memory alloy layer is bent and deformed, and a control point corresponding to the bent and deformed memory alloy layer is partially protruded from the first plane. Each memory alloy layer is connected to two electrodes, and the two electrodes are located on the circuit board for connecting the memory alloy layer to a circuit, so that a current can flow through the memory alloy layer, to adjust the temperature of the memory alloy layer to enable the temperature of the memory alloy layer to fluctuate above and below the specified threshold. Therefore, the memory alloy layer changes repeatedly between deformation and recovery deformation, and vibration occurs. Therefore, the sensing apparatus can control and set the vibration of the memory alloy layer based on the control circuit, and can transmit information by touch without depending on vision and hearing.

That the specified memory alloy layer is bent and deformed refers to: an extending direction of the memory alloy layer is changed, which is different from stretching deformation. For example, the memory alloy layer is a sheet memory alloy layer. Normally, a surface of the sheet memory alloy layer is parallel to the first plane. When the sheet memory alloy layer is bent and deformed, one part of the sheet memory alloy layer is still located on the first plane, and the other part is protruded from the first plane. For example, the sheet memory alloy layer changes from a plane state to a curved state. If the elastic layer and the memory alloy are superposed, an overall structure after the superposition may be columnar or elliptical. This is not limited in this application. The elastic layer may be bent and deformed and recovered to the original shape with the memory alloy layer. Specifically, the elastic layer may be synchronously bent and deformed with the memory alloy layer. Alternatively, the elastic layer may be deformed differently from the memory alloy layer. The deformation of the elastic layer is only used to recover the memory alloy layer to the original shape.

It should be noted that each control point may include one memory alloy layer, or may include at least two memory alloy layers. When the specified memory alloy layer is bent and deformed, a control point corresponding to the specified memory alloy layer is partially protruded from the first plane. A local part of the control point may be understood as a local part of any one of the memory alloy layer and the elastic layer fixed to the memory alloy layer included in the control point.

A specific arrangement manner of the control points in the sensing apparatus is not limited, and may be in matrix arrangement, spiral arrangement, circular arrangement array, or any other suitable array or irregular arrangement.

When the control points are designed by the sensing apparatus, each control point may include one memory alloy layer, or may include at least two memory alloy layers. When the control point includes only one memory alloy layer, a vibration frequency of the memory alloy layer can be adjusted by controlling a frequency or a current value of an input current of the memory alloy layer. Certainly, the vibration frequency of the memory alloy layer may be a fixed value. When the control point includes at least two memory alloy layers, the vibration frequency of each memory alloy layer may be a fixed value, and vibration frequencies of different memory alloy layers are different. In an embodiment, a vibration frequency of the control point can be changed by selecting different memory alloy layers in each control point, and a control process is simple. When the at least two memory alloy layers in the control point are disposed, arrangement directions of the at least two memory alloy layers may be parallel to the first plane, to ensure that all memory alloy layers of the sensing apparatus are located on a same plane.

A shape of the memory alloy layer is not limited, for example, the memory alloy layer may be a strip memory alloy layer. Only one end of the strip memory alloy layer is fixed to the circuit board. In other words, one end of the strip memory alloy layer is fixed to the circuit board, and the other end of the strip memory alloy layer is in a free state. In an embodiment, the strip memory alloy layer is a cantilever beam, and when deformation occurs, a large deformation amplitude can be generated, thereby enhancing a vibration sensation generated by the memory alloy layer. Specifically, the vibration frequency of each memory alloy layer may be at least 0.1 mm.

When the memory alloy layer is disposed, a material of the memory alloy layer may be a nickel titanium memory alloy, and the memory alloy layer may be deformed at a specified temperature by matching design between temperature and shape. The shape of the memory alloy layer may be a straight line, a triangle, an oval, a Y-shaped, a U-shaped, or a pincer shape. This application imposes no limitation, and the shape of the memory alloy layer may be designed based on a requirement.

When the elastic layer is arranged, a material of the elastic layer is a high-toughness material, and the high-toughness material may be organic matter such as light-sense epoxy resin (SU-8) or high-strength metal material such as copper, steel, or iron. That is, the elastic layer may be a photosensitive epoxy resin elastic layer, a copper elastic layer, a steel elastic layer, or an iron elastic layer. The shape of the elastic layer may be the same as a shape of a correspondingly superposed memory alloy layer, or may be different from a shape of a correspondingly superposed memory alloy layer. This is not limited in this application.

In an embodiment of this application, the sensing apparatus may be prepared by using a semiconductor processing process, to prepare a small-sized sensing apparatus. The memory alloy layer may be a nano-scale memory alloy layer or a micron-scale memory alloy layer, thereby implementing high-density integrated preparation, and miniaturization of the sensing apparatus. Further, the sensing apparatus may be integrated on an electronic device with a small size, such as a ring.

The circuit board of the sensing apparatus may alternatively be a flexible circuit board, that is, the control point is prepared on the flexible circuit board, and the sensing apparatus may be a flexible sensing apparatus. The flexible sensing apparatus may be installed on a flexible electronic device such as a glove or smart clothing, thereby enriching an application scenario of the sensing apparatus.

According to a second aspect, this application further provides an electronic device. The electronic device includes the sensing apparatus in any one of the foregoing embodiments, and further includes a control circuit electrically connected to the sensing apparatus. The control circuit is configured to control vibration of a specified memory alloy layer of the sensing apparatus. Specifically, the control circuit includes a plurality of input/output interfaces, and two electrodes of each memory alloy layer are connected to the input/output interfaces in a one-to-one correspondence, so that the control circuit can independently control each memory alloy layer. The control circuit is configured to control an amount of electricity of the memory alloy layer through the input/output interface, where the amount of electricity of the memory alloy layer controls a temperature of the memory alloy layer, to control deformation of the memory alloy layer. The control circuit may be further configured to receive the to-be-transmitted information, input a current to a memory alloy layer at a specified control point based on the to-be-transmitted information, and make the temperature of the specified memory alloy layer fluctuate above and below the specified threshold by adjusting an amount of electricity of the current, to vibrate the specified memory alloy layer. The vibration may be sensed by a human body by touch, to transmit information by touch, thereby enriching transmission manners of the information.

In an embodiment, the control circuit may control the current input to the memory alloy layer to change periodically, and the memory alloy layer vibrates at a fixed vibration frequency. The control circuit adjusts a variation period of the current input to the memory alloy layer, and the vibration frequency of the memory alloy layer can be adjusted.

The frequency of the input current of the memory alloy layer is controlled by the control circuit and the characteristic that the elastic layer is fixed to the memory alloy layer is provided. Therefore, the vibration frequency of the memory alloy layer in an embodiment of this application can reach 10 Hz to 300 Hz, to be easily sensed by the human body.

When the sensing apparatus is used, the control circuit may be configured to adjust a frequency and/or a current value of a current input to the memory alloy layer, so that the temperature of the memory alloy layer may fluctuate at a different frequency between upper and lower fluctuation frequencies of the specified threshold, so that the control circuit may adjust the vibration frequency of the memory alloy layer. The skin of the human body has a plurality of mechanical sensors, different mechanical sensors can receive different frequency ranges, and the human body also has different perceptions of vibrations received by different mechanical sensors. Therefore, in the embodiments of this application, the vibration frequency of the memory alloy layer is adjusted, so that different mechanical sensors of the human body can receive vibrations of the memory alloy layer at a corresponding position, and the human body can sense depth information of the position. Therefore, by using an embodiment of this application, three-dimensional information transmission can be implemented by using the sensing apparatus, to enrich types of information that can be transmitted by the sensing apparatus.

To transmit the three-dimensional information, each control point may further include at least two memory alloy layers, and the control circuit controls vibration frequencies of at least two memory alloy layers in each control point to be different, so that an appropriate memory alloy layer may be selected based on different depths that are to be expressed by the control point, thereby facilitating a control process. Specifically, for example, the to-be-transmitted information includes the three-dimensional information, and coordinates of the three-dimensional information are (x, y, z), where (x, y) determines a sequence number or coordinate of a selected control point, and a value of z determines a memory alloy layer in the selected control point. The (x, y) and z have a mapping relationship with the control point and the memory alloy layer in the control point.

In addition, the to-be-transmitted information includes track information of a graph, so that the control circuit may control a vibration sequence of each specified control point based on the track information of the graph. Therefore, the track information of the graph is displayed by the sensing apparatus. Specifically, the control circuit sets, based on the track information of the graph, that vibration start times of control points corresponding to a track of the graph are different, so that the vibration sequence of each specified control point may be controlled.

To increase the vibration frequency of the memory alloy layer, the electronic device further includes a temperature sensor. The temperature sensor monitors a temperature of the memory alloy layer, and the control circuit may obtain a temperature signal of the temperature sensor, where the temperature signal is triggered based on the temperature that is of the memory alloy layer and that is monitored by the temperature sensor. When the temperature of the memory alloy layer rises to the specified threshold in a process of inputting a current from the control circuit, and in this case, the temperature sensor detects that the temperature of the memory alloy layer is the specified threshold, and the temperature signal is triggered. In other words, the memory alloy layer is in a critical state of deformation. In this case, the control circuit determines that a current amount of electricity is a specified amount of electricity for driving deformation of the memory alloy layer. A vibration period of each memory alloy layer may be controlled. After the amount of electricity of the memory alloy layer reaches the specified amount of electricity, the amount of electricity is reduced, for example, the amount of electricity is 0. Therefore, an embodiment can make the memory alloy layer recover rapidly after deformation, to complete one vibration period, which is beneficial to reduce duration of the vibration period and increase the vibration frequency.

The sensing apparatus may further include a reference memory alloy layer disposed on the circuit board, and the temperature sensor monitors a temperature of the reference memory alloy layer. The reference memory alloy layer is identical to the rest of the memory alloy layers, but may be positioned within, beside the control point, or at an edge of the circuit board. A position of the reference memory alloy layer may be designed based on the requirement, to facilitate preparation and arrangement of the sensing apparatus.

In addition to transmitting graphic information such as character information or pattern information, the sensing apparatus may also serve only as vibration feedback. For example, the electronic device may further include a virtual keyboard. The sensing apparatus and the virtual keyboard are superposed. Specifically, the sensing apparatus may be located below the virtual keyboard, and a control point of the sensing apparatus corresponds to a virtual key of the virtual keyboard. By setting a mapping relationship between the control point of the sensing apparatus and the virtual key based on an actual installation position relationship, the virtual key is associated with a control point located below the virtual key, and when the virtual key is operated, the control circuit can control the control point corresponding to the virtual key to vibrate. Therefore, a vibration feedback is formed, and a real feeling of using the virtual keyboard by a user is improved.

A specific type of the electronic device is not limited. For example, the electronic device may be any one of a watch, a wristband, a ring, a glove, a mobile phone, or smart clothing. In short, any electronic device may be disposed at a position that can be touched by human skin, which falls within the protection scope of this application.

According to a third aspect, this application further provides an electronic device control method in any one of the foregoing embodiments. The control method includes: receiving to-be-transmitted information, where the to-be-transmitted information includes character information, pattern information, or operation information, generating control point control information based on the to-be-transmitted information, where the control point control information and the to-be-transmitted information have a specified mapping relationship, and the control point control information includes a sequence number of a control point, a vibration frequency of the control point, and vibration duration of the control point, and inputting, based on the control point control information, a periodic current to a memory alloy layer of a specified control point, to vibrate the specified memory alloy layer, thereby implementing a transmission process of the to-be-transmitted information. In an embodiment, that information can be transmitted by vibration of the memory alloy layer, and the vibration can be sensed by touch, so that the information can be transmitted by touch, thereby enriching information transmission manners.

To adjust the vibration frequency of the memory alloy layer, a duty cycle of the periodic current may be adjusted. Specifically, the duty cycle of the periodic current is determined based on heat of deformation of the memory alloy layer, a current value input to the memory alloy layer, a resistance value of the memory alloy layer, and the vibration frequency of the memory alloy layer. The duty cycle of the periodic current satisfies:

$$D=t/(1/f)\cdot 100\%-n, \text{ where } t=Q/I^2R.$$

D is the duty cycle of the periodic current, t is power-on duration when the memory alloy layer is deformed, Q is the heat when the memory alloy layer is deformed, I is the current value input to the memory alloy layer, R is the resistance value of the memory alloy layer, f is the vibration frequency of the memory alloy layer, n is an adjustment coefficient, and $5\% \leq n \leq 10\%$.

When the current is disconnected or decreased, the memory alloy layer still has residual heat and in a deformation state. Therefore, the duty cycle may have the adjustment coefficient of 5% to 10%, so that an actual vibration frequency of the memory alloy layer meets a requirement. In an embodiment, the vibration frequency of the memory alloy layer can be adjusted by adjusting the duty cycle of the periodic current.

To transmit three-dimensional information, the to-be-transmitted information includes depth information. In the control method, when the control point control information is generated based on the to-be-transmitted information, a plurality of pieces of the depth information may be further classified into N control intervals based on sizes of the plurality of pieces of the depth information, where $N \geq 2$. Periodic currents corresponding to the control interval are input to the specified memory alloy layer based on the control point control information, so that vibration frequencies of the memory alloy layers corresponding to different control intervals are different. In an embodiment, different vibration frequencies are used to feed back control intervals of different depth information to distinguish different depths, to transmit the three-dimensional information.

The vibration frequency of the memory alloy may include three levels, and each level has a different vibration frequency. Specifically, vibration frequencies of the three levels correspond to different mechanical sensors of human skin, and the vibration frequencies of the three levels are respectively in ranges of 1 Hz to 40 Hz, 40 Hz to 60 Hz, and 200 Hz to 300 Hz. Therefore, the human skin can distinguish the three vibration frequencies to distinguish different depth information, thereby feeling the three-dimensional information.

The to-be-transmitted information includes track information of a graph, and in the control method, when the control point control information is generated based on the to-be-transmitted information, a vibration sequence of the control point may be further generated based on the track information of the graph in the to-be-transmitted information. Based on the vibration sequence of the control point, a current is sequentially input to the specified memory alloy layers, so that the specified memory alloy layers vibrate sequentially. Therefore, a plurality of control points can be controlled to form a track of a graph, to enrich types of transmitted information.

The to-be-transmitted information may further include character auxiliary information, and content of the character auxiliary information includes color information, name information, quantity information, and/or position information. In the control method, control point control information may be further generated based on the character auxiliary information, and the memory alloy layer of the specified control point may be controlled based on the control point control information, to transmit character content of the character auxiliary information, thereby improving comprehensiveness of transmitting information by the sensing apparatus of the electronic device.

REFERENCE NUMERALS

100: Electronic device; 110: Virtual keyboard;
111: Virtual key; 200: Sensing apparatus;
210: Circuit board; 220: Control point matrix;
221: Control point; 2211: Memory alloy layer;
2212: Elastic layer; 223: Electrode;
300: Control circuit; 400: Skin;
401: Epidermal layer; 402: Corium layer;
403: Subcutaneous tissue; 410: Merkle's disc;
420: Tactile corpuscle; 430: Ruffini's corpuscle;
440: Pacini's corpuscle; and 500: Power supply apparatus.

DESCRIPTION OF EMBODIMENTS

Terms used in the following embodiments are merely intended to describe example embodiments, but are not intended to limit this application. As used in the specification and appended claims of the application, singular expressions "one", "a", "the", "the foregoing", "this", and "the one" are also intended to include expressions such as "one or more", unless the contrary is clearly indicated in its context.

Reference to "an embodiment", "some embodiments", or the like described in this specification indicates that one or more embodiments of this application include a feature, structure, or characteristic described with reference to the embodiments. The terms "include", "contain", "have", and their variants all mean "include but are not limited to", unless otherwise specifically emphasized.

To facilitate understanding of a sensing apparatus, an electronic device, and a control method and an apparatus for the electronic device that are provided in the embodiments of this application, the following first describes an application scenario of the sensing apparatus, the electronic device, and the control method and the apparatus for the electronic device. At present, transmission of information between man and machine mainly depends on vision and hearing of a human being, but touch of the human being can also implement reception of information. However, a technology of using the touch to implement the transmission of information between man and machine has not been developed and applied maturely. This application provides a sensing apparatus, an electronic device using the sensing apparatus, and a control method for the electronic device by using a characteristic that a memory alloy can deform with a temperature. To make the objectives, embodiments, and advantages of this application clearer, the following further describes this application in detail with reference to the accompanying drawings.

Figure 1:
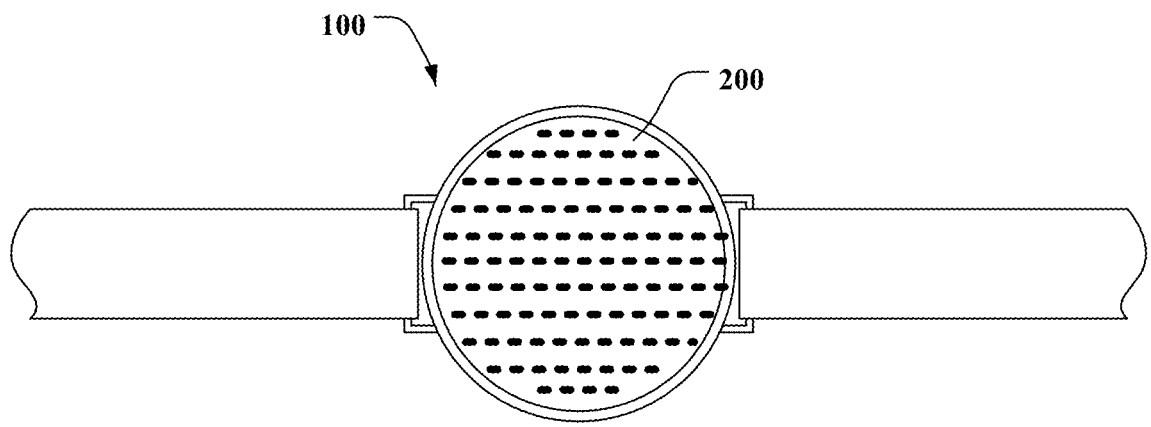
FIG. 1 is a schematic diagram of a structure of an electronic device according to an embodiment of this application.

FIG. 1 is a schematic diagram of a structure of an electronic device according to an embodiment of this application. As shown in FIG. 1, the electronic device 100 may be configured to transmit information. Specifically, the electronic device 100 may include a sensing apparatus 200, to transmit, by touch, information that is to be transmitted by using the electronic device 100. The electronic device 100 may be a watch, a wristband, a ring, a glove, a mobile phone, or smart clothing. In FIG. 1, an example in which the electronic device 100 is the watch is used. A specific type of the electronic device 100 is not limited in this application. The sensing apparatus 200 is disposed in an area of the electronic device 100 that can be touched by human skin, so that a user can feel a surface of the sensing apparatus 200 through the skin, and can obtain information in a scenario in which it is not convenient to read an image or listen to a sound, thereby enriching transmission forms of the information.

Figure 2:
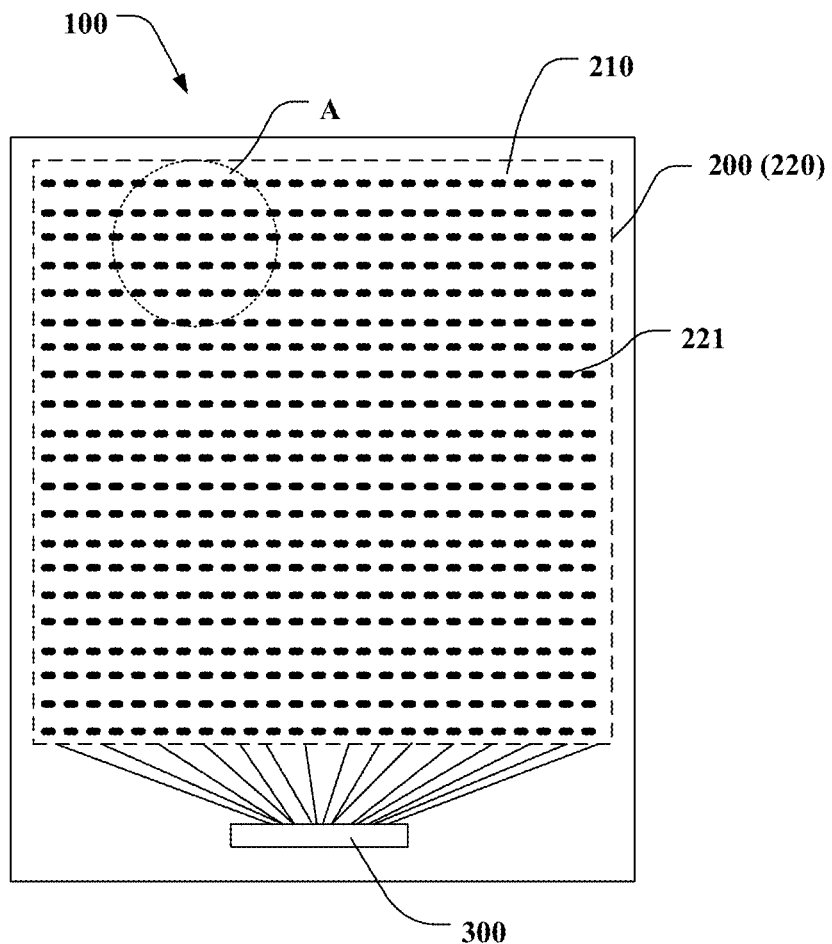
FIG. 2 is a schematic diagram of a partial structure of a terminal device according to an embodiment of this application.
Figure 3:
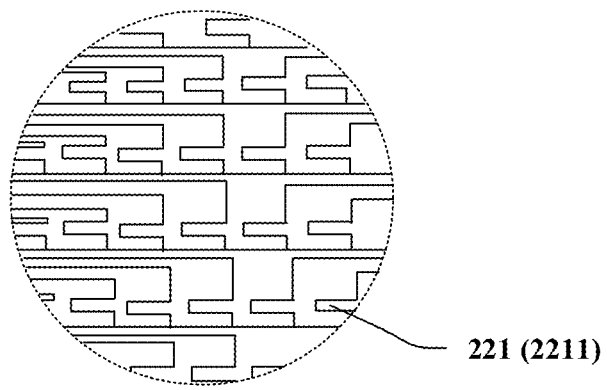
FIG. 3 is a partially enlarged view of A in FIG. 2.
Figure 4A:
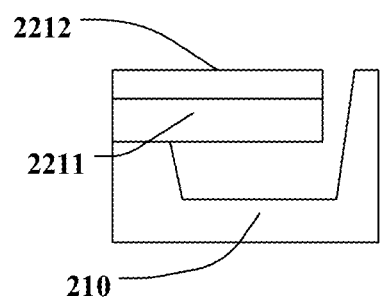
FIG. 4a and FIG. 4b are schematic diagrams of a structure of a memory alloy layer according to an embodiment of this application.
Figure 4B:
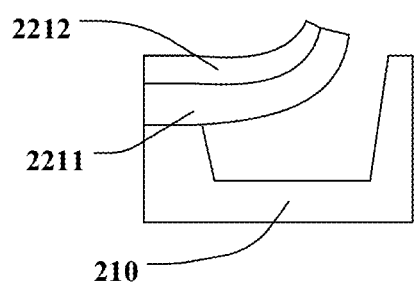
Figure 5:
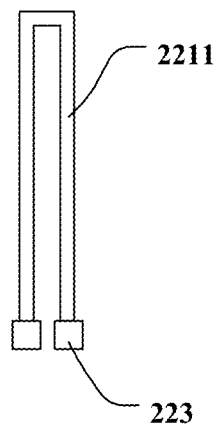
FIG. 5 is a schematic diagram of a structure of a shape of a memory alloy layer according to an embodiment of this application.

FIG. 2 is a schematic diagram of a partial structure of a sensing apparatus according to an embodiment of this application, FIG. 3 is a partially enlarged view of A in FIG. 2, and FIG. 4a and FIG. 4b are schematic diagrams of a structure of a cross section of a memory alloy layer according to an embodiment of this application. As shown in FIG. 2 and FIG. 3, the sensing apparatus 200 includes a circuit board 210 and a control point matrix 220 fixed to the circuit board 210. A plurality of control points 221 are arranged in the control point matrix 220, and each of the plurality of control points 221 has a different position on the circuit board 210, that is, each control point has a unique position. Each control point 221 includes a memory alloy layer 2211 and an elastic layer 2212, where the memory alloy layer 2211 is a memory alloy material, and the elastic layer 2212 is a high-toughness material. As shown in FIG. 4a and FIG. 4b, the elastic layer 2212 and the memory alloy layer 2211 are superposed and fixed in a one-to-one correspondence. The elastic layer 2212 is configured to provide a reset force after the memory alloy layer 2211 is deformed. When a driving force of the memory alloy layer 2211 is weakened or disappears, the elastic layer 2212 drives the memory alloy layer 2211 to rapidly recover an original shape. FIG. 5 is an overhead view of a structure of a memory alloy layer 2211 according to an embodiment of this application. With reference to FIG. 5, each memory alloy layer 2211 is connected to two electrodes 223. The two electrodes 223 are located on the circuit board 210 and are configured to connect the memory alloy layer 2211 to the current circuit. Therefore, a current flows into the memory alloy layer 2211 from one electrode 223 and flows out of the memory alloy layer 2211 from the other electrode 223, so that each memory alloy layer 2211 can be independently connected to the circuit, to independently control each memory alloy layer 2211. When a temperature of each memory alloy layer 2211 is lower than a specified threshold, all the control points 221 are located on a first plane M, that is, when no current flows into the sensing apparatus 200 or the current is very small, and the sensing apparatus 200 is in a normal state or a standby state, all the control points 221 are located on a same plane, that is, the first plane M. When a temperature of a specified memory alloy layer 2211 is higher than the specified threshold, the specified memory alloy layer 2211 is bent and deformed, and a control point at which the specified memory alloy layer 2211 is located is partially protruded from the first plane M. A shape of the memory alloy can vary with a temperature, shapes of the memory alloy layer 2211 at different temperature states can be designed, so that the memory alloy layer 2211 can be deformed when the temperature is higher than the specified threshold in an operating state. The specified memory alloy layer 2211 is controlled to perform periodic deformation, that is, vibration, and can be used as a vibration feedback of operation information, thereby improving a real feeling of an operation. Alternatively, a plurality of the memory alloy layers 2211 are formed into a graph, and the graph may be a character graph, a pattern graph, a graph of a special symbol, or the like. The sensing apparatus 200 can obtain the shape of the above-described graph by touch, thereby transmitting information without depending on vision and hearing. The specified threshold may be determined based on performance, a shape, a size, and the like of the memory alloy layer 2211, and may be understood as a critical temperature at which the memory alloy layer 2211 is deformed.

That the specified memory alloy layer 2211 is bent and deformed refers to: an extending direction of the memory alloy layer 2211 is changed, which is different from stretching deformation. For example, the memory alloy layer 2211 is a sheet memory alloy layer. Normally, a surface of the sheet memory alloy layer is parallel to the first plane M. When the sheet memory alloy layer is bent and deformed, one part of the sheet memory alloy layer is still located on the first plane M, and the other part is protruded from the first plane. For example, the sheet memory alloy layer changes from a plane state to a curved state. Herein, the sheet memory alloy layer 2211 has a thickness, but a size of the sheet memory alloy layer 2211 in a thickness direction is much smaller than sizes of other directions. When the memory alloy layer 2211 and the elastic layer 2212 are superposed, the whole may be columnar or elliptical.

When the memory alloy layer 2211 is disposed, the memory alloy layer 2211 is made of a memory alloy, and the shape of the memory alloy layer 2211 can vary with the temperature. The elastic layer 2212 is a high-toughness material and has elasticity. When the memory alloy layer 2211 is deformed, if the temperature decreases, the elastic layer 2212 can rapidly recover the memory alloy layer 2211 to an original shape. The elastic layer 2212 bends and deforms and recovers the original shape with the memory alloy layer 2211. Specifically, the elastic layer 2212 and the memory alloy layer 2211 can simultaneously bend and deform and recover the original shape. Alternatively, it may be possible to make deformation of the elastic layer 2212 different from deformation of the memory alloy layer 2211. The deformation of the elastic layer 2212 is only used to generate a reset force to recover the memory alloy layer 2211 to the original shape.

The arrangement of the elastic layer 2212 can make the memory alloy layer 2211 rapidly recover the original shape when an amount of electricity is decreased and the temperature of the memory alloy layer 2211 is lower than the specified threshold, and can make the memory alloy layer 2211 rapidly deform when the amount of electricity is increased. If the elastic layer 2212 is not disposed, the memory alloy layer 2211 may utilize a long time to recover the original shape, and the temperature decreases by a large number of degrees. When the memory alloy layer 2211 is to be deformed in a next period, the amount of electricity is increased, and the temperature of the memory alloy layer 2211 is also increased by a large number of degrees. In this case, a long time is required, resulting in a lower vibration frequency. In an embodiment, the elastic layer 2212 rapidly recovers the memory alloy layer 2211 to the original state, a degree that the temperature is decreased is small, the degree that the temperature is to be increased when the memory alloy layer 2211 is deformed is also small, and the amount of electricity required is also small, so that deformation can occur rapidly. If the vibration frequency of the memory alloy layer 2211 obviously increases, an optional range of the vibration frequency of the memory alloy layer 2211 is increased, which is convenient for human body identification and facilitates adjustment of the vibration frequency of the memory alloy layer 2211 based on a requirement.

A material of the memory alloy layer 2211 may be a nickel titanium memory alloy, and the memory alloy layer 2211 may be deformed at a specified temperature by matching design between temperature and shape. The elastic layer 2212 is an elastic layer 2212 prepared from a high-toughness material, which may be an organic substance such as a light-sensitive epoxy resin (SU-8) or a high-strength material such as copper, steel or iron. That is, the elastic layer 2212 may be a light-sensitive epoxy resin elastic layer 2212, a copper elastic layer 2212, or a steel or iron elastic layer 2212.

As shown in FIG. 4a and FIG. 4b, when the memory alloy layer 2211 is disposed, the memory alloy layer 2211 may be a strip memory alloy layer 2211, one end of the strip memory alloy layer 2211 is fixed to the circuit board 210, and the other end of the strip memory alloy layer 2211 is free to the circuit board 210, which forms a cantilever beam to facilitate deformation of the memory alloy layer 2211. Specifically, the extension direction of the strip memory alloy layer 2211 is parallel to the first plane M. FIG. 4a is a schematic diagram of the memory alloy layer 2211 in a flattened state. In this case, when the memory alloy layer 2211 is not energized or is less energized, the memory alloy layer 2211 is disposed parallel to the first plane M. FIG. 4b is a schematic diagram of deformation occurring after the memory alloy layer 2211 is energized. In this case, the memory alloy layer 2211 has been energized, and an amount of electricity makes the temperature of the memory alloy layer 2211 higher than the specified threshold, one end of the memory alloy layer 2211 is still fixed to the circuit board 210, and the other end of the memory alloy layer 2211 is tilted and protruded from the first plane M. In this case, the memory alloy layer 2211 may be tilted by a relatively large amplitude. An embodiment can increase an amplitude of the memory alloy layer 2211, so that the user can feel more obvious, and sensitivity of the sensing apparatus 200 to transmit information is higher.

Figure 6A:
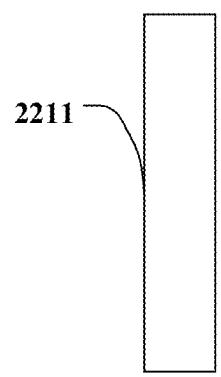
FIG. 6a to FIG. 6e are schematic diagrams of a shape of a structure of a memory alloy layer according to an embodiment of this application.
Figure 6B:
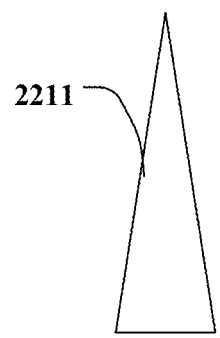
Figure 6C:
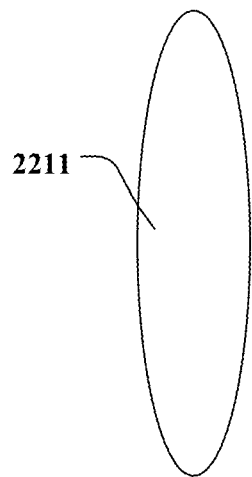
Figure 6D:
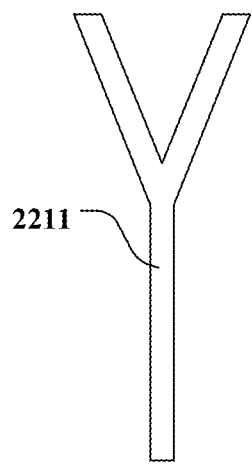
Figure 6E:
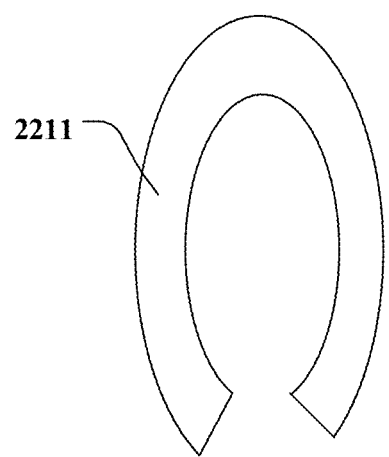

A shape of the strip memory alloy layer 2211 is not limited, except for a U shape shown in FIG. 5. As shown in FIG. 6a to FIG. 6e, the shape of the strip memory alloy layer 2211 may alternatively be a straight line, a triangular shape, an oval shape, a Y shape, or a pincer shape, or may be a shape selected as required. The strip memory alloy layer shown in FIG. 6a is a straight line memory alloy layer. The strip memory alloy layer shown in FIG. 6b is a triangular memory alloy layer. The strip memory alloy layer 2211 shown in FIG. 6c is an oval memory alloy layer. The strip memory alloy layer shown in FIG. 6d is a Y-shaped memory alloy layer. The strip memory alloy layer shown in FIG. 6e is a pincer-shaped memory alloy layer.

Figure 7A:
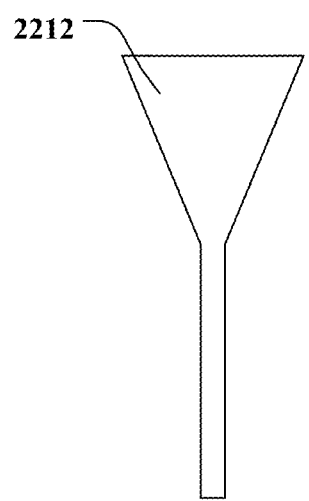
FIG. 7a and FIG. 7b are schematic diagrams of a shape of a structure of an elastic layer according to an embodiment of this application.
Figure 7B:
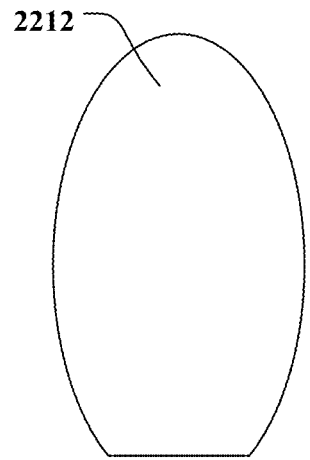

The shape of the elastic layer 2212 may be the same as or different from that of the memory alloy layer 2211. When the shape of the elastic layer 2212 is the same as the shape of the memory alloy layer 2211, a superposed product of the entire memory alloy material and the elastic layer material may be prepared first. The independent memory alloy layer 2211 and the elastic layer 2212 are prepared by further dividing, so that the elastic layer 2212 can be easily prepared, and the elastic layer 2212 and the memory alloy layer 2211 have a relatively good pressure transmission capability. In addition, the shape of the elastic layer 2212 may be different from that of the memory alloy layer 2211. For example, an outer contour of the elastic layer 2212 may be substantially the same as that of the memory alloy layer 2211. Two examples are listed below. When the shape of the memory alloy layer 2211 is Y-shaped as shown in FIG. 6d, a shape of a corresponding elastic layer 2212 may be shown in FIG. 7a, that is, the elastic layer 2212 is a closed structure, and no groove in the Y-shaped shape exists. Similarly, when the shape of the memory alloy layer 2211 is pincer-shaped as shown in FIG. 6e, a shape of a corresponding elastic layer 2212 may be shown in FIG. 7b, and the elastic layer 2212 is also a closed structure.

In addition, in an example embodiment, a position relationship between the memory alloy layer and the elastic layer is not limited, and it is only required that the elastic layer can provide a reset force after the memory alloy layer is deformed.

When the control point matrix 220 of the sensing apparatus 200 is prepared, a line width of a component may be reduced by using a semiconductor processing process, including a plurality of technologies including multi-channel deposition lithography. In an embodiment, the memory alloy layer 2211 may be a nano-scale memory alloy layer or a micro-scale memory alloy layer, and high density integrated preparation of the sensing apparatus is implemented. For example, in the control point matrix 220 of 1 cm×1 cm, 10 million×10 million memory alloy layers 2211 may be arranged, and a density of the control points 221 is high, so that accurate information transmission can be implemented. In addition, the sensing apparatus may be further miniaturized, and further may be integrated into an electronic device with a small size, such as a ring.

In addition, to ensure a vibration life of the memory alloy layer 2211, a deformation amplitude of the memory alloy layer 2211 is smaller than fatigue deformation of the elastic layer 2212. In an example process, high density point array preparation can be implemented by adjusting a sequence of the multi-channel deposition lithography, selecting photoresist appropriately, studying a ratio of corrosive liquid, adjusting corrosion time and temperature, and combining with a heat treatment process.

A specific arrangement manner of the control points 221 in the control point matrix 220 is not limited, and may be in matrix arrangement, spiral arrangement, circular arrangement array, or any other suitable array or irregular arrangement. This is not limited in this application.

When the sensing apparatus 200 is prepared, the sensing apparatus 200 may use a chip packaging structure, and the electrode 223 of the memory alloy layer 2211 may be packaged into the circuit board 210 by using a ball grid array (BGA) package technology. A ball-shaped pin grid array packaging technology is to make array solder balls at a bottom of a package body substrate as an I/O end of a circuit to connect to the circuit board, and the electrode 223 of each memory alloy layer 2211 can be routed under the point matrix, and the BGA has small volume. The BGA has advantages of a small size, good heat dissipation, and high electrical performance, which is conducive to implementing miniaturization of the sensing apparatus 200 and improving performance of the sensing apparatus 200. Alternatively, each electrode 223 may be led to an edge of the circuit board 210. This is not limited in this application.

In an embodiment, the circuit board 210 of the sensing apparatus 200 may be a flexible circuit board, and may be bent and folded, so that the sensing apparatus 200 may be disposed in another flexible electronic device of a glove or smart clothing.

Figure 8:
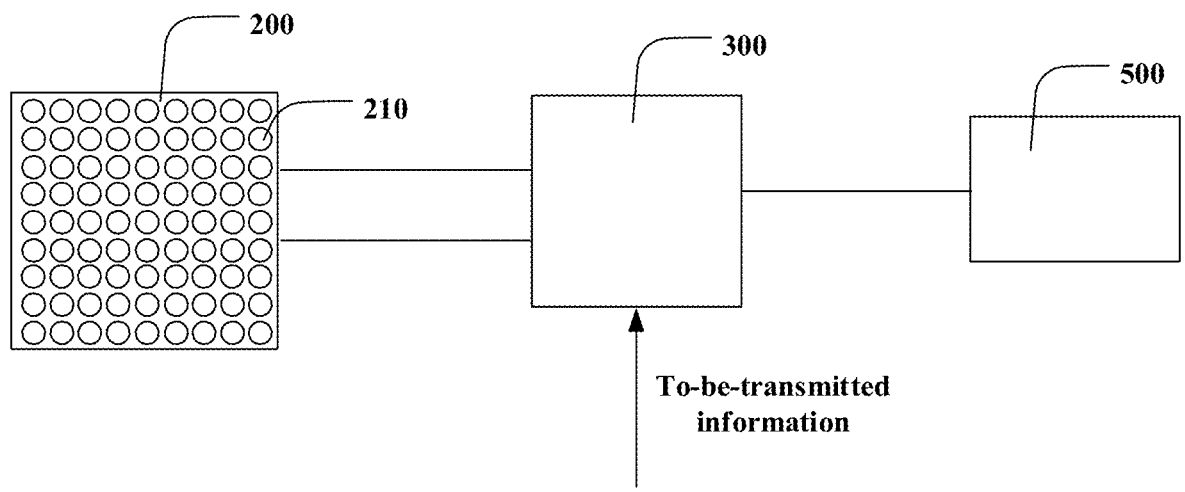
FIG. 8 is a schematic diagram of a structure of an electronic device according to an embodiment of this application.

Specifically, when the sensing apparatus 200 is used, the sensing apparatus 200 may be installed on the electronic device 100. FIG. 8 is a schematic diagram of a structure of the electronic device according to an embodiment of this application. As shown in FIG. 8, the electronic device 100 includes a sensing apparatus 200, a control circuit 300, and a power supply apparatus 500. The power supply apparatus 500 is electrically connected to the control circuit 300, and the control circuit 300 is electrically connected to the sensing apparatus 200, so that the control circuit 300 may control a current transmitted to the sensing apparatus 200, and further control information transmitted by the sensing apparatus 200. Specifically, the control circuit 300 includes a plurality of groups of input/output interfaces, and two electrodes 223 of each memory alloy layer 2211 of control points 221 of the sensing apparatus 200 are electrically connected to one group of input/output interfaces in a one-to-one correspondence. Therefore, the control circuit 300 can independently control an amount of electricity in each memory alloy layer 2211, and the amount of electricity directly controls a temperature of the memory alloy layer 2211, to control whether the memory alloy layer 2211 is deformed or not, and further adjust a vibration frequency of the memory alloy layer 2211 by adjusting a frequency of the amount of electricity. In an example application, the control circuit 300 may be configured to receive to-be-transmitted information, input a current to the memory alloy layer 2211 of a specified control point 221 based on the received to-be-transmitted information, and make a temperature of a specified memory alloy layer 2211 fluctuate above and below a specified threshold by adjusting the amount of electricity of the current, so that the specified memory alloy layer 2211 frequently changes between deformation and restoration, and the specified memory alloy layer 2211 vibrates. The vibration can be sensed by the human body by touch, to transmit information.

It should be noted that, that the control circuit 300 controls the amount of electricity in the memory alloy layer 2211 may indicate that the control circuit 300 controls a current value input to the memory alloy layer 2211. In other words, when a required amount of electricity is large, a corresponding input current value is large, and when a required amount of electricity is small, a corresponding input current value is small. However, when the current value is small, the current value is not zero. The control circuit 300 may further control the current of the memory alloy layer 2211 to be on or off, that is, when the required amount of electricity is large, a specified current value is correspondingly input, and when the amount of electricity is small, the current is turned off, that is, the amount of electricity is zero.

In an embodiment, the control circuit 300 may control the current input to the memory alloy layer 2211 to change periodically, so that the memory alloy layer 2211 vibrates at a fixed vibration frequency. The control circuit 300 adjusts a variation period of the current input to the memory alloy layer 2211, so that the vibration frequency of the memory alloy layer 2211 can be adjusted.

When the control circuit 300 is disposed, the control circuit 300 may be a control chip or a design circuit. This is not limited in this application, and may be designed based on an actual product requirement.

In an embodiment, a type of the to-be-transmitted information is not limited, and may be, for example, graphic information such as character information or pattern information. Specifically, when the to-be-transmitted information is the graphic information, the specified memory alloy layer 2211 of the control point 221 at a specified position can be vibrated through control of the control circuit 300, to form a specified graph, and a user can sense the specified graph.

The user can obtain the information transmitted by the sensing apparatus 200, to implement information transmission by touch. The specified position is a position corresponding to a position of the graph in the to-be-transmitted information obtained by the control circuit 300.

The elastic layer 2212 is fixed to the memory alloy layer 2211 in an embodiment of this application, and deformation can be rapidly recovered. By adjusting the current input to the memory alloy layer 2211, a vibration frequency of the memory alloy layer 2211 may be 10 Hz to 300 Hz, so that the information is sensed by the human body.

When the current input to the memory alloy layer 2211 is set, the current may be selected based on a requirement, and may be set in combination with a shape, a resistance value, and the like of the memory alloy layer 2211. The vibration frequency of the memory alloy layer 2211 is directly related to the change of the temperature of the memory alloy layer 2211, and both a magnitude and a frequency of the current affect the vibration frequency of the memory alloy layer 2211. Therefore, the vibration frequency of the memory alloy layer 2211 may be adjusted by adjusting the magnitude and the frequency of the current. For example, a periodic current of a rectangular wave is input to the memory alloy layer 2211. When a structure of the memory alloy layer 2211 is unchanged, that is, a shape and a resistance value of the memory alloy layer 2211 are unchanged, a current of fixed frequency is input to the memory alloy layer 2211. When the magnitude of the current is adjusted, the vibration frequency of the memory alloy layer 2211 changes accordingly, and an example change process is shown in Table 1.

TABLE 1

Corresponding relationship between the memory alloy layer 2211 and the current

| Current | Frequency |
| --- | --- |
| 2 A | 300 Hz |
| 1.42 A | 150 Hz |
| 1.15 A | 100 Hz |

The control circuit 300 includes a receiving unit and an information processing unit. The receiving unit is configured to receive to-be-transmitted information, such as operation information, character information, or pattern information, that is to be transmitted to the user by using the sensing apparatus 200, and send the to-be-transmitted information to the information processing unit. Specifically, the receiving unit may receive local terminal information, or may obtain the to-be-transmitted information from another device in a communication manner such as Bluetooth, Wi-Fi, or cellular. The information processing unit is configured to process the received to-be-transmitted information to generate control point control information, which may include, for example, a number and a sequence of control points 221 corresponding to the to-be-transmitted information that is to be deformed, and the vibration frequency of the deformed memory alloy layer 2211. The information processing unit transmits point matrix control information to the control circuit 300, and the control circuit 300 controls, based on the control information, the magnitude or on/off of the current of the specified memory alloy layer 2211, to vibrate the memory alloy layer 2211 at the specified position to form the graph.

The sensing apparatus 200 receives the to-be-transmitted information, and may input the to-be-transmitted information into the control circuit 300 by using an input device such as a keyboard, a mouse, or a touchscreen. Alternatively, the control circuit 300 may read the to-be-transmitted information from a storage device. That is, the electronic device 100 including the sensing apparatus 200 may be connected to a keyboard, a mouse, a touchscreen, or a storage device, to transmit information that is to be transmitted.

Specifically, when the sensing apparatus 200 is applied, the current input to the memory alloy layer 2211 and the vibration frequency of the memory alloy layer 2211 may be adjusted by the control circuit 300, so that the sensing apparatus 200 can transmit three-dimensional information. For example, the vibration frequencies of the memory alloy layer 2211 are respectively in ranges of 1 Hz to 40 Hz, 40 Hz to 60 Hz, and 200 Hz to 300 Hz, to adapt to different mechanical sensors of the human skin, so that the human body can feel the three-dimensional information.

Figure 9:
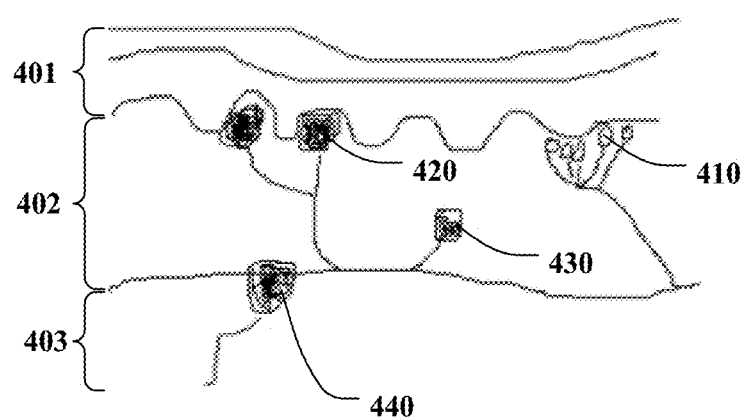
FIG. 9 is a schematic diagram of distribution of mechanical sensors in human skin.

FIG. 9 is a schematic diagram of distribution of mechanical sensors in human skin. As shown in the figure, human skin 400 sequentially includes an epidermal layer 401, a corium layer 402, and a subcutaneous tissue 403 from the outside to the inside. There are mainly four types of mechanical sensors in the human skin 400: a Merkle's disc 410, a tactile corpuscle (or Meissner's corpuscle) 420, a Ruffini's corpuscle 430, and a Pacini's corpuscle 440. The Merkle's disc 410 is located in the epidermal layer 401 and is a slow-adaptive receptor capable of sensing mild tactile stimulation and persistent touch and pressure. The Meissner's corpuscle is located at an upper end of the corium layer 402, and is close to the epidermal layer 401. This corpuscle has a large density in skin of a palm of fingers and a metatarsal surface of toes, which is sensitive to light touch and low frequency vibrations (about 50 Hz), can feel vibration stimulation of the skin 400, and can distinguish a distance between the two contacts. This body belongs to a rapid adaptation type, that is, can rapidly sense pressure vibration. The Ruffini's corpuscle 430 is located at the corium layer 402 and is able to feel tension deep in the skin 400. Pacini's corpuscle 440 is located deep in the corium layer 402 of the skin 400, is fast adaptive, and is sensitive to high frequency vibrations (about 200 to 300 Hz).

When the vibration frequency of the memory alloy layer 2211 is 1 Hz to 40 Hz, the vibration can be sensed by the Merkle's disc 410, and the epidermal layer 401 of the skin 400 can sense the vibration. When the vibration frequency of the memory alloy layer 2211 is 40 Hz to 60 Hz, the vibration can be sensed by the Meissner's corpuscle, so that the vibration can be sensed by the upper end of the corium layer 402. When the vibration frequency of the memory alloy layer 2211 is 200 Hz to 300 Hz, the vibration can be sensed by the Pacini's corpuscle 440, so that the vibration can be sensed deep in the corium layer 402. Therefore, by adjusting the frequency and/or the current value of the memory alloy layer 2211 by the control circuit 300, the vibration frequency of the memory alloy layer 2211 can be adjusted, so that different mechanical sensors of the skin 400 can receive different stimulation. In an embodiment, the sensing apparatus 200 may transmit information of a three-dimensional structure.

Specifically, the control circuit 300 may process the received to-be-transmitted information. A to-be-transmitted graph is a three-dimensional graph, information of the three-dimensional graph is coordinates of three directions of an X axis, a Y axis, and a Z axis. The control circuit 300 may determine, based on the coordinates of the X axis and the Y axis, a number of a control point 221 that is to be vibrated, and may determine a vibration frequency of a memory alloy layer 2211 in the control point 221 based on the coordinates of the Z axis. In an embodiment, because the human skin 400 can distinguish only three vibration frequencies at present, the control circuit 300 may evenly divide the coordinates of the Z axis into three intervals, and each interval corresponds to one frequency. The control circuit 300 controls, based on an instruction of the control circuit 300, a corresponding memory alloy layer 2211 to vibrate at a required frequency, so that the skin 400 can feel depth information of the three-dimensional graph. Certainly, in another embodiment, the coordinates of the Z axis may be divided into two intervals, to simply experience depth differences of the three-dimensional graph.

Figure 10:
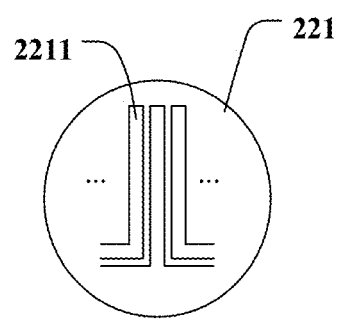
FIG. 10 is another partially enlarged view of a sensing apparatus according to an embodiment of this application.

FIG. 10 is another partially enlarged view of a sensing apparatus according to an embodiment of this application. As shown in the figure, each control point 221 of a sensing apparatus 200 may include at least two memory alloy layers 2211, and vibration frequencies of the at least two memory alloy layers 2211 of each control point 221 are different. Specifically, the control circuit 300 may control a frequency and a current value of a current input to a corresponding memory alloy layer 2211, to keep the corresponding memory alloy layer 2211 in a specified frequency range. For example, if each sensing apparatus 200 includes three memory alloy layers 2211, vibration frequencies of the three memory alloy layers 2211 may be respectively in ranges of 1 Hz to 40 Hz, 40 Hz to 60 Hz, and 200 Hz to 300 Hz, to adapt to a mechanical sensor of human skin 400, to transmit three-dimensional information. In this embodiment, when a three-dimensional graph is transmitted by using the sensing apparatus 200, a frequency of a memory alloy layer 2211 at a control point 221 at a specified position is not adjusted, and an appropriate memory alloy layer 2211 at the control point 221 at the specified position is selected for vibration, and a control process is simple. Certainly, each control point 221 may further include two memory alloy layers 2211, three memory alloy layers 2211, or another quantity of memory alloy layers 2211, which may be selected and set based on a requirement.

Specifically, when the memory alloy layer 2211 is disposed at the control point 221, the at least two memory alloy layers 2211 may be densely arranged in a small range of the control point 221. As shown in FIG. 9, the memory alloy layers 2211 in the control point 221 are located on a same plane. That is, an arrangement direction of the memory alloy layers 2211 is parallel to a first plane M, and an arrangement process of the memory alloy layers 2211 is relatively simple.

The sensing apparatus 200 in this embodiment of this application may further transmit track information of the graph in addition to conventional characters, patterns, and three-dimensional information of the graph. Specifically, the control circuit 300 may determine, based on to-be-transmitted information, a vibration sequence of the control point 221 in addition to the control point 221 that is to be vibrated, and a vibration sequence of the control point 221 is consistent with a track of a graph corresponding to the control point 221. Therefore, the sensing apparatus 200 can display the track information of the graph, that is, transmit the track information. For example, the to-be-transmitted information is a letter "Z", and a writing track of "Z" is used as an example. FIG. 10 is a schematic diagram of a graph in which the sensing apparatus displays the letter "Z" according to an embodiment of this application. With reference to FIG. 10, each control point 221 has a number. To display track information of the letter "Z", the control circuit 300 may control control points 221 respectively numbered 2, 3, 4, 5, 10, 15, 20, 21, 22, and 23 to vibrate sequentially, and in control, time points at which the control points 221 start to vibrate may be delayed sequentially, so that the user can feel the writing track of the letter "Z".

The sensing apparatus 200 may further include a temperature sensor. The temperature sensor monitors a temperature of the memory alloy layer 2211. The control circuit 300 may obtain a temperature signal of the temperature sensor. Specifically, the temperature sensor and the control circuit 300 may be connected in a wired or wireless manner. A specific connection manner is not limited in this application. The control circuit 300 inputs a current to the memory alloy layer 2211, and when the temperature of the memory alloy layer 2211 reaches a specified threshold in the process of energizing, the control circuit 300 may determine that a current amount of electricity of the memory alloy layer 2211 is an amount of electricity that drives deformation of the memory alloy layer 2211. Therefore, in an operating process, when the amount of electricity of the memory alloy layer 2211 reaches a current value in each vibration period, the memory alloy layer 2211 can be deformed without more amount of electricity, thereby reducing a waste of power to the memory alloy layer 2211. In addition, the temperature of the memory alloy layer can be prevented from rising more than the specified threshold, which is conducive to rapid recovery of an original shape of the memory alloy layer 2211, reducing cycle time, and increasing the vibration frequency of the memory alloy layer 2211.

To simplify the structure of the sensing apparatus 200, the sensing apparatus 200 may include a reference memory alloy layer 2211, and the sensing apparatus 200 monitors a temperature of the reference memory alloy layer 2211. In an embodiment, the sensing apparatus 200 may monitor the temperature of the reference memory alloy layer 2211, where the reference memory alloy layer 2211 is disposed on the circuit board 210, and may be located on an edge of the control point matrix 220, or may not be located in the control point matrix 220, and reference control points 221 may be arranged based on a requirement, to facilitate preparation and arrangement of the sensing apparatus 200.

Figure 12:
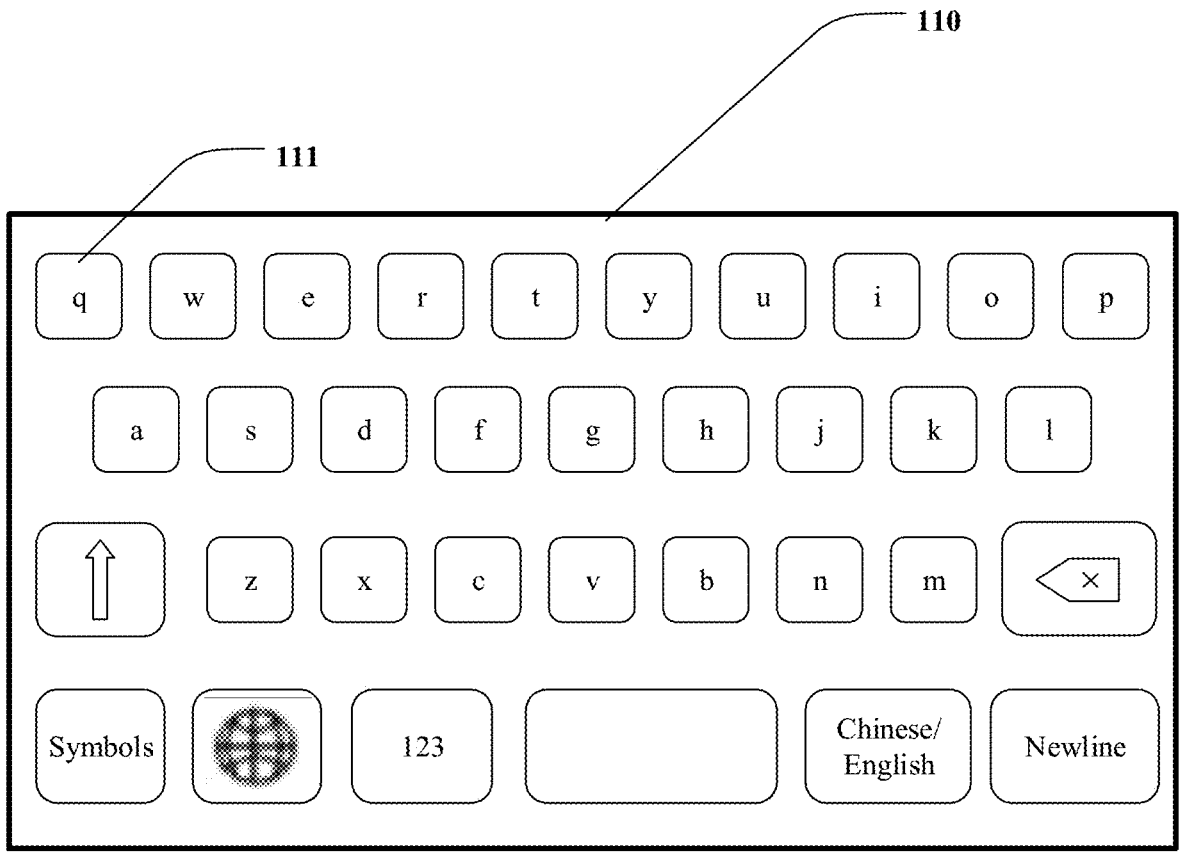
FIG. 12 is a schematic diagram of a structure of a virtual keyboard of an electronic device according to an embodiment of this application.
Figure 13:
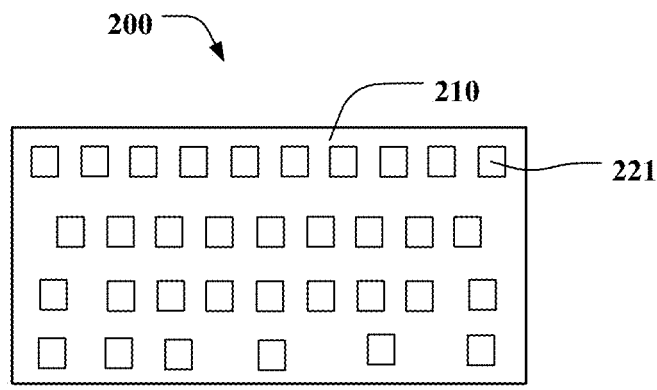
FIG. 13 is a schematic diagram of a structure of the sensing apparatus of the electronic device disposed in FIG. 11 according to an embodiment of this application.

The to-be-transmitted information may alternatively be vibration feedback information, that is, the sensing apparatus is only configured to feed back a vibration sensation at a specified position. For example, FIG. 12 is a schematic diagram of a structure of a virtual keyboard of an electronic device according to an embodiment of this application. FIG. 13 is a schematic diagram of a structure of the sensing apparatus of the electronic device disposed in FIG. 12 according to an embodiment of this application. As shown in FIG. 12 and FIG. 13, the electronic device 100 may have a virtual keyboard 110, for example, the virtual keyboard 110 of a touchscreen, and the sensing apparatus 200 and the virtual keyboard 110 are superposed. Virtual keys 111 of the virtual keyboard 110 correspond to control points 221 of the sensing apparatus 200. The virtual keys 111 correspond to the control points 221 of the control point matrix 220 one by one, or one virtual key 111 corresponds to a group of control points 221 of the control point matrix 220. In an embodiment, the to-be-transmitted information may be information that the virtual key 111 is operated. When the virtual key 111 of the electronic device 100 is operated, the control circuit 300 may obtain a position of the operated virtual key 111, and control a memory alloy layer 2211 corresponding to the operated virtual key 111 to vibrate. As a vibration feedback apparatus of the virtual key 111, a real feeling of using the virtual key 111 by the user is improved.

In an optional embodiment, the to-be-transmitted information may further include virtual keyboard pressing duration and force. The control circuit 300 adjusts the vibration frequency and vibration duration of the memory alloy layer 2211 based on the received duration or force that the user presses the virtual keyboard. For example, table query adjustment is performed by using a preset mapping table. Table 2 is a table of a mapping relationship between the virtual keyboard pressing duration and the vibration frequency and the vibration duration, and the table shows segmented response virtual key pressing duration. Alternatively, the vibration duration of the memory alloy layer 2211 may be controlled to be the same as duration that the corresponding virtual key is pressed, and the vibration frequency of the memory alloy layer 2211 is controlled to gradually increase as pressing duration increases. In addition, only the vibration frequency or the vibration duration may be adjusted to respond to the pressing duration or force of the virtual key.

TABLE 2

Mapping relationship between the virtual keyboard press duration and the vibration frequency and the vibration duration

| Virtual key pressing duration | Vibration frequency | Vibration duration |
|---|---|---|
| <t1 | f1 | T1 |
| [t1, t2] | f2 | T2 |
| >t2 | f2 | T3 |

Figure 14:
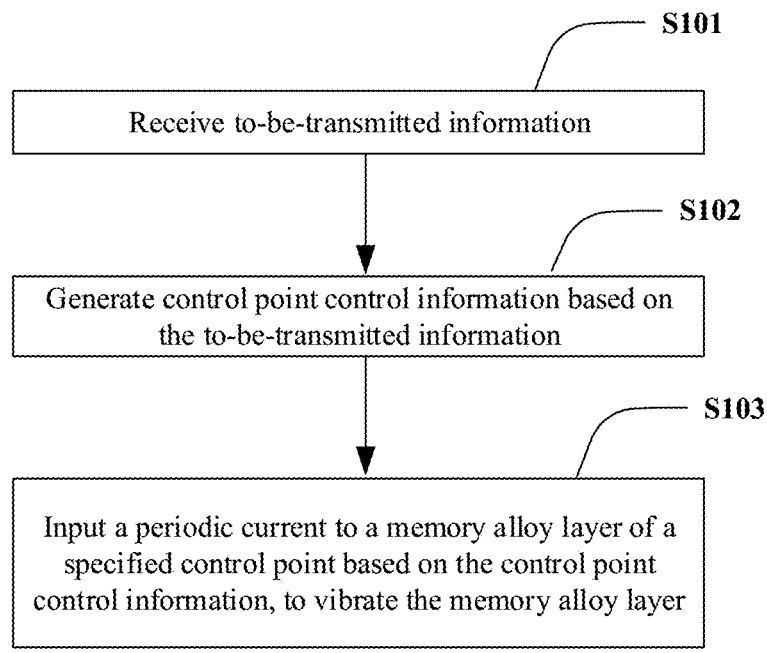
FIG. 14 is a flowchart of a control method for an electronic device according to an embodiment of this application.

Based on a same invention concept, this application further provides a control method for an electronic device in any one of the foregoing embodiments. FIG. 14 is a flowchart of a control method for an electronic device according to an embodiment of this application. As shown in FIG. 14, the control method includes the following operations.

Operation S101: Receive to-be-transmitted information.

Specifically, the to-be-transmitted information may be character information, or may be graphic information such as pattern information, or may be vibration feedback information. This is not limited in this application. The received to-be-transmitted information may be input to a control circuit by using an input device such as a keyboard, a mouse, or a touchscreen, or may be the to-be-transmitted information read by the control circuit from a storage device. This is not limited in this application.

Table 3 is a table of the to-be-transmitted information. As shown in Table 3, a to-be-transmitted graph is parsed into a plurality of graphic element points based on triplet information of the to-be-transmitted information, and each graphic element point corresponds to one graphic element point coordinate. When the to-be-transmitted information is the vibration feedback information, a point corresponding to the graphic element point is a point that triggers a vibration feedback operation. In the table, T2>T1.

TABLE 3

Table of the to-be-transmitted information

| Graphic element point ID | Graphic element point coordinates | Display start time | Display end time | Display duration |
|---|---|---|---|---|
| 1 | [X1, Y1] | T1 | T2 | T2-T1 |
| 2 | [X2, Y2] | T1 | T2 | T2-T1 |
| 3 | [X3, Y3] | T1 | T2 | T2-T1 |
| 4 | [X4, Y4] | T1 | T2 | T2-T1 |

Operation S102: Generate control point control information based on the to-be-transmitted information.

The control point control information may include a sequence number of a control point, a vibration frequency of the control point, and vibration duration of the control point. The vibration duration of the control point may be reflected as setting of vibration start time and vibration end time. According to the to-be-transmitted information, a sequence number of a control point corresponding to a position that is to be vibrated may be determined. Specifically, the to-be-transmitted information may be parsed to obtain the graphic element point coordinates of the graph, and then the graphic element point coordinates of the graph are mapped and converted to control point coordinates of control points in a control point matrix, to obtain the coordinates of the control point that is to be vibrated. In other words, a sequence number (ID) of the control point that is to be vibrated can be obtained. Without special requirements, the vibration frequency may be a default value, for example, 20 Hz, 50 Hz, or 100 Hz. This is not limited in this application. The vibration duration of the control point determines display time of the graph. When the to-be-transmitted information is pattern information, image recognition is also required by using image recognition function, to generate the control point control information.

Table 4 is a table of the control point control information. As shown in Table 4, the control point control information shown in Table 4 may be generated based on the to-be-transmitted information in Table 2 and with reference to a correspondence between the control point control information and the to-be-transmitted information, where T2'>T1'. In this embodiment, the vibration frequency remains unchanged, and a graph transmitted by a sensing apparatus is a two-dimensional character or a planar pattern, so that a user can uniformly sense a contour formed by vibration, thereby restoring the transmitted character or the pattern at a cognitive level, thereby implementing tactile information perception of the skin.

TABLE 4

Table of the control point control information

| Control point coordinates | Point matrix ID | Vibration frequency | Vibration start time | Vibration end time |
| --- | --- | --- | --- | --- |
| [X1, Y1] | 1' | f1 | T1' | T2' |
| [X2, Y2] | 2' | f1 | T1' | T2' |
| [X3, Y3] | 3' | f1 | T1' | T2' |
| [X4, Y4] | 4' | f1 | T1' | T2' |

In Table 4, the vibration duration of the control point is controlled by setting the vibration start time and the vibration end time. Alternatively, the control point may have minimum duration t. Therefore, control point vibration duration in the control point control information may be maintained by using a multiple of the vibration start time and the minimum duration t, for example, 2t or 3t. In addition, to preheat a memory alloy layer at the control point, the memory alloy layer may be preheated in advance for a period of time when the sensing apparatus is started, to ensure accuracy of vibration of the memory alloy layer.

Operation S103: Input a periodic current to a memory alloy layer of a specified control point based on the control point control information, to vibrate the memory alloy layer.

Based on the control point control information, the control point that is to be vibrated, that is, the memory alloy layer of the specified control point, can be determined. By inputting the periodic current to the specified memory alloy layer, a temperature of the memory alloy layer can be changed to vibrate, to implement information transmission. In an embodiment, character information or pattern information is transmitted by using the sensing apparatus, and a plurality of vibration control points in the control point matrix of the sensing apparatus may be further formed into a specified graph. The specified graph corresponds to the to-be-transmitted information. The user may recognize content of the to-be-transmitted information by sensing vibration of the control points of the sensing apparatus. The periodic current may be implemented by controlling on/off of the current, or may be implemented by controlling a magnitude change of the current. When the periodic current is implemented by controlling the magnitude change of the current, the memory alloy layer can be deformed when the current is large, and that the memory alloy layer can be restored to an original shape when the current is small. In other words, the magnitude change of the current can drive the memory alloy layer to vibrate.

Figure 15:
FIG. 15 is a schematic diagram of a to-be-transmitted pattern according to an embodiment of this application.

The following describes the control method in this application by using an example in which the to-be-transmitted information is the pattern information. The pattern information may be input to the control circuit of the electronic device by using an I/O device such as a keyboard or a mouse. Alternatively, the control circuit of the electronic device may read a pattern or a photograph from the storage device, for example, a photograph taken or a picture delivered with a system. When the pattern information is a complex pattern or photograph, for example, a photograph or pattern that is taken or drawn in advance, a contour may be extracted from the pattern first, and position coordinates of the contour line are used as the to-be-transmitted information. Then, a sequence number of control points that are of the control point matrix and that are mapped to the position coordinates of the contour line is generated. For example, FIG. 15 is a schematic diagram of a to-be-transmitted pattern according to an embodiment of this application. As shown in the figure, the pattern is a photo of flowers, blue sky, and white clouds. In this case, image recognition may be performed by using an image recognition function, and then the foregoing pattern is displayed by using the control point matrix. An example process is as follows:

Pattern information is obtained. Specifically, the pattern shown in FIG. 15 may be obtained.

Image recognition is performed on the pattern information, to recognize that there are yellow sunflowers at the bottom of the pattern, two white clouds on the upper right, the blue sky on the background (no color is displayed in the figure), coordinate positions corresponding to a contour of each element, and the like. The information may be used as the control point control information.

Figure 16:
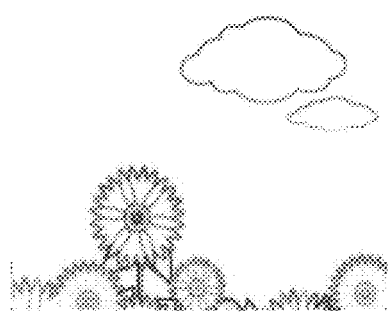
FIG. 16 is an outline of a pattern displayed by a control point matrix according to an embodiment of this application.

Based on a coordinate position corresponding to the contour of each element in the control point control information, a periodic current is input to a memory alloy layer of a control point corresponding to the contour of each element, to vibrate the memory alloy layer. The control point matrix of the sensing apparatus forms the contour of the figure. FIG. 16 is a contour of each element displayed in the control point matrix according to an embodiment of this application.

As in the process shown in the foregoing embodiment, the to-be-transmitted information may further include character auxiliary information, and the character auxiliary information may include color information, name information, quantity information, and/or position information. When the sensing apparatus is used for display, the character auxiliary information may be described and displayed by using characters. Specifically, a paragraph may be used to describe the character auxiliary information, or a key word may be used to describe the character auxiliary information. When the control point control information is generated based on the to-be-transmitted information in operation S102, the control point control information may be generated based on the character auxiliary information, and the control point at the specified position is vibrated, so that the sensing apparatus can transmit a character graph corresponding to the character auxiliary information. For example, in the pattern shown in FIG. 15, in addition to displaying the contour of each element, keywords such as "four", "yellow", and "sunflower"; and/or "two", "white cloud", "upper right" may be displayed, to improve comprehensiveness of information transmission and enhance accuracy of users' tactile recognition perception.

Alternatively, in addition to the pattern information, the to-be-transmitted information may further include edited character information, and the pattern information and the character information are simultaneously displayed by using the sensing apparatus.

In an embodiment of this application, the sensing apparatus may be further configured to transmit track information. In this case, the to-be-transmitted information includes track information of a graph. Table 5 is a table of another to-be-transmitted information. As shown in Table 5, display start times of graphic element points are not completely the same, so that the graphic element points are displayed sequentially. In each record, display end time is greater than display start time.

TABLE 5

Table of another to-be-transmitted information

| Graphic element point ID | Graphic element point coordinates | Display start time | Display end time | Display duration |
|---|---|---|---|---|
| 1 | [X1, Y1] | T1 | T2 | T2-T1 |
| 2 | [X2, Y2] | T3 | T4 | T4-T3 |
| 3 | [X3, Y3] | T5 | T6 | T6-T5 |
| 4 | [X4, Y4] | T7 | T8 | T8-T7 |

The control point control information shown in Table 6 may be generated based on the to-be-transmitted information in Table 5 and with reference to a correspondence between the control point control information and the to-be-transmitted information.

TABLE 6

Table of control point control information

| Control point coordinates | Point matrix ID | Vibration frequency | Vibration start time | Vibration end time |
|---|---|---|---|---|
| [X1, Y1] | 1' | f1 | T1' | T2' |
| [X2, Y2] | 2' | f1 | T3' | T4' |
| [X3, Y3] | 3' | f1 | T5' | T6' |
| [X4, Y4] | 4' | f1 | T7' | T8' |

Figure 11:
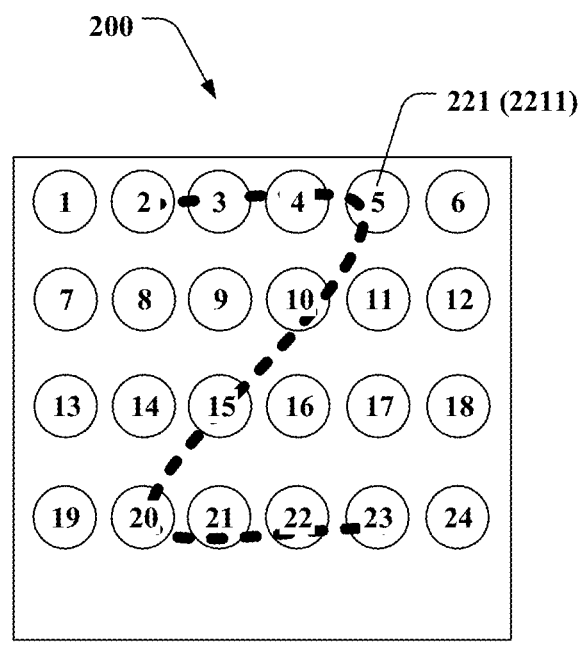
FIG. 11 is a schematic diagram of a graph showing a letter "Z" displayed by a sensing apparatus according to an embodiment of this application.

For example, the control point matrix shown in FIG. 11 includes 6×6 control points, each control point has a number, and to display track information of the letter "Z", control points respectively numbered 2, 3, 4, 5, 10, 15, 20, 21, 22 and 23 can be controlled to vibrate sequentially. In control, time points at which the control points start to vibrate may be delayed sequentially, so that the user can feel a writing track of the letter "Z".

Specifically, when the sensing apparatus is applied, three-dimensional information may be transmitted by adjusting a current input to the memory alloy layer and controlling vibration frequencies of control points at different positions, thereby displaying a three-dimensional graph. Specifically, the to-be-transmitted information further includes depth information, that is, in addition to X axis coordinates and Y axis coordinates, coordinates of each graphic element point in the to-be-transmitted information further include Z axis coordinates, where the Z axis coordinates in the coordinates of each graphic element point are the depth information. Table 7 is a table of another to-be-transmitted information. As shown in Table 7, the coordinates of each graphic element point include the Z axis coordinates.

TABLE 7

Table of another to-be-transmitted information

| Graphic element point ID | Graphic element point coordinates | Display start time | Display end time | Display duration |
|---|---|---|---|---|
| 1 | [X1, Y1, Z1] | T1 | T2 | T2-T1 |
| 2 | [X2, Y2, Z2] | T1 | T2 | T2-T1 |
| 3 | [X3, Y3, Z3] | T1 | T2 | T2-T1 |
| 4 | [X4, Y4, Z4] | T1 | T2 | T2-T1 |
| 5 | [X5, Y5, Z5] | T1 | T2 | T2-T1 |
| 6 | [X6, Y6, Z6] | T1 | T2 | T2-T1 |

Operation S102 further includes: classifying a plurality of pieces of the depth information into N control intervals based on sizes of the plurality of pieces of the depth information, where N≥2. In other words, the plurality of pieces of the depth information in the three-dimensional information are classified and quantized based on size values. The plurality of pieces of the depth information are classified into several levels. Alternatively, all depth information in the to-be-transmitted information is classified into N control intervals. Each control interval corresponds to a vibration frequency, so that the vibration is felt by different skin depths, thereby implementing three-dimensional tactile perception. Specifically, when the depth information is classified into the N control intervals, a maximum value and a minimum value of Z axis position information may be obtained, and interval classification is performed, where an offset of each interval is (Zmax−Zmin)/N. Table 8 is a table of another control point control information, and the control point control information generated in operation S102 is shown in Table 8.

TABLE 8

Table of another control point control information

| Control point coordinates | Control point ID | Z axis control interval | Vibration frequency | Vibration start time | Vibration end time |
|---|---|---|---|---|---|
| [X1, Y1, Z1] | 1 | 1 | f1 | T1' | T2' |
| [X2, Y2, Z2] | 2 | 1 | f1 | T1' | T2' |
| [X3, Y3, Z3] | 3 | 2 | f2 | T3' | T4' |
| [X4, Y4, Z4] | 4 | 2 | f2 | T3' | T4' |
| [X5, Y5, Z5] | 5 | 3 | f3 | T5' | T6' |
| [X6, Y6, Z6] | 6 | 3 | f3 | T5 | T6' |

Operation S103 includes: inputting a periodic current corresponding to the control interval to the memory alloy layer of the control point, so that vibration frequencies of memory alloy layers corresponding to different control intervals are different, and the sensing apparatus transmits three-dimensional information. For example, for the contents of Table 6, a current that can generate a vibration frequency f1 may be input to control points numbered 1 and 2, a current that can generate a vibration frequency f2 may be input to control points numbered 3 and 4, and a current that can generate a vibration frequency f3 is input to control points numbered 5 and 6, so that vibration frequencies corresponding to the different control intervals are different, and different mechanical sensors can be triggered, so that the sensing apparatus can transmit the three-dimensional information.

There are three mechanical sensors in human skin for different vibration frequencies. When the vibration frequency of the memory alloy layer is 1 Hz to 40 Hz, the vibration can be sensed by a Merkle's disc, so that skin epidermis can sense the vibration. When the vibration frequency of the memory alloy layer is 40 Hz to 60 Hz, the vibration can be sensed by a Meissner's corpuscle, so that the vibration can be sensed by an upper end of a corium layer. When the vibration frequency of the memory alloy layer is 200 Hz to 300 Hz, the vibration can be sensed by a Pacini's corpuscle, so that the vibration can be sensed deep in the corium layer. Therefore, by adjusting a current frequency and/or a current value of the memory alloy layer, the vibration frequency of the memory alloy layer can be adjusted, so that the vibration of the memory alloy layer is received by different mechanical sensors of the skin, and different stimulations are obtained.

To correspond to the mechanical sensors in the human skin, the vibration frequencies of the memory alloy layer may include three levels, and the vibration frequencies of the three levels respectively correspond to vibration frequencies responded by the Merkle's disc, the Meissner's corpuscle, and the Pacini's corpuscle of the human skin. Specifically, the vibration frequencies of the three levels may be respectively set to ranges of 1 Hz to 40 Hz, 40 Hz to 60 Hz, and 200 Hz to 300 Hz. For example, the vibration frequencies of the three levels may be respectively 5 Hz, 50 Hz, and 250 Hz. When the depth information is classified, the plurality of pieces of the depth information are also classified into three control intervals, which sequentially correspond to frequencies of the foregoing three levels.

When the vibration frequency of the memory alloy layer is adjusted, a duty cycle of the current can be adjusted to adjust the vibration frequency of the memory alloy layer, so that the vibration frequency of the corresponding memory alloy layer can be controlled based on the control intervals of the depth information. Specifically, a duty cycle of the periodic current may be determined based on heat when the memory alloy layer is deformed, a value of a current input to the memory alloy layer, a resistance value of the memory alloy layer, and the vibration frequency of the memory alloy layer. Specifically, for different vibration frequencies, the duty cycle of the periodic current satisfies:

$D = t/(1/f) \cdot 100\% - n$, where $t = Q/I^2 R$.

D is the duty cycle of the periodic current, t is power-on duration when the memory alloy layer is deformed, Q is the heat when the memory alloy layer is deformed, I is the current value input to the memory alloy layer, R is the resistance value of the memory alloy layer, f is the vibration frequency of the memory alloy layer, and n is an adjustment coefficient, where $5\% \leq n \leq 10\%$.

The memory alloy layer still has residual heat when the current is disconnected or decreased, the memory alloy layer still has a deformation state. Therefore, the duty cycle may have an adjustment coefficient of 5% to 10%, so that an actual vibration frequency of the memory alloy layer meets a requirement.

Alternatively, when each control point of the sensing apparatus includes at least two memory alloy layers, vibration frequencies of the at least two memory alloy layers of each control point are different. For example, if each sensing apparatus includes three memory alloy layers, vibration frequencies of the three memory alloy layers may be respectively in ranges of 1 Hz to 40 Hz, 40 Hz to 60 Hz, and 200 Hz to 300 Hz, to adapt to a mechanical sensor of the human skin. In this embodiment, when the three-dimensional graph is transmitted by using the sensing apparatus, a frequency of a memory alloy layer of a control point at a specified position does not need to be adjusted. The memory alloy layer corresponding to the frequency of the control point 221 at the specified position is selected based on the depth information to perform vibration, and a control process is simple.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide operations for implementing a function in one or more processes in the flowcharts and/or in one or more blocks in the block diagrams.

Certainly, a person skilled in the art can make various modifications and variations to this application without departing from the protection scope of this application. In this way, this application is intended to cover these modifications and variations of this application provided that they fall within the scope of the claims of this application and equivalent technologies thereof

What is claimed is:

1. A sensing apparatus, comprising a circuit board and a plurality of control points fixed to the circuit board,
    wherein each control point of the plurality of control points is located at a different position on the circuit board, each control point comprises at least two memory alloy layers and an elastic layer, the at least two memory alloy layers and the elastic layer of each control point are superposed and fixed in a one-to-one correspondence, each memory alloy layer is connected to two electrodes, and the two electrodes are located on the circuit board,
    wherein, when a temperature of each memory alloy layer is lower than a specified threshold, all the control points are located on a first plane, and, when a temperature of a specified memory alloy layer is higher than the specified threshold, the specified memory alloy layer and the elastic layer are deformed, and a part of a control point corresponding to the specified memory alloy layer is protruded from the first plane, and
    wherein vibration frequencies of the at least two memory alloy layers of a first control point are configured to be controlled to be different.

2. The sensing apparatus according to claim 1, wherein each control point comprises at least two memory alloy layers.

3. The sensing apparatus according to claim 1, wherein the memory alloy layer is a strip memory alloy layer, one end of the strip memory alloy layer is fixed to the circuit board, and another end of the strip memory alloy layer is free relative to the circuit board.

4. An electronic device, comprising:
    a sensing apparatus, the sensing apparatus comprising a circuit board and a plurality of control points fixed to the circuit board,
        wherein each control point of the plurality of control points is located at a different position on the circuit board, each control point comprises at least two memory alloy layers and an elastic layer, the at least two memory alloy layers and the elastic layer of each control point are superposed and fixed in a one-to-one correspondence, each memory alloy layer is connected to two electrodes, and the two electrodes are located on the circuit board, and
        wherein, when a temperature of each memory alloy layer is lower than a specified threshold, all the control points are located on a first plane, and, when a temperature of a specified memory alloy layer is higher than the specified threshold, the specified memory alloy layer and the elastic layer are deformed, and a part of a control point corresponding to the specified memory alloy layer is protruded from the first plane; and
    a control circuit electrically connected to the sensing apparatus, wherein the control circuit comprises a plurality of groups of input/output interfaces, the two electrodes of each memory alloy layer are electrically connected to a group of input/output interfaces of the plurality of groups of input/output interfaces in a one-to-one correspondence,
        wherein the control circuit is configured to adjust an amount of electricity of one or more of the memory alloy layers, wherein the amount of electricity controls a temperature of the memory alloy layer,
        wherein the control circuit is configured to receive to-be-transmitted information, and control, based on the to-be-transmitted information, the amount of electricity of a memory alloy layer of a first control point of the plurality of control points, so that the memory alloy layer of the first control point vibrates, and
        wherein the control circuit is further configured to control that vibration frequencies of the at least two memory alloy layers of the first control point are different.

5. The electronic device according to claim 4, wherein each control point comprises at least two memory alloy layers.

6. The electronic device according to claim 4, wherein the memory alloy layer is a strip memory alloy layer, one end of the strip memory alloy layer is fixed to the circuit board, and another end of the strip memory alloy layer is free relative to the circuit board.

7. The electronic device according to claim 4, wherein the control circuit is further configured to control a vibration sequence of the first control point based on the to-be-transmitted information.

8. The electronic device according to claim 4, further comprising a temperature sensor, wherein the temperature sensor is configured to monitor the temperature of the memory alloy layer, the control circuit is configured to obtain a temperature signal of the temperature sensor, and the temperature signal is a signal triggered in response to the temperature of the memory alloy layer that is detected by the temperature sensor reaching the specified threshold, and
    wherein the control circuit is further configured to determine an amount of electricity when the temperature signal is received as an amount of electricity driving deformation of the memory alloy layer.

9. The electronic device according to claim 8, further comprising a reference memory alloy layer disposed on the circuit board, wherein the temperature sensor is further configured to monitor a temperature of the reference memory alloy layer.

10. The electronic device according to claim 4, wherein the electronic device comprises a virtual keyboard, the sensing apparatus and the virtual keyboard are superposed, the virtual keyboard comprises a virtual key, the virtual key corresponds to one of the control points of the sensing apparatus, and, when the virtual key is operated, the control circuit is further configured to control vibration of a control point corresponding to an operated virtual key.

11. The electronic device according to claim 4, wherein the electronic device comprises a watch, a wristband, a ring, a glove, a mobile phone, or smart clothing.

12. A control method for an electronic device, the electronic device comprising a sensing apparatus, and the sensing apparatus comprising a circuit board and a plurality of control points fixed to the circuit board,
    wherein each control point of the plurality of control points is located at a different position on the circuit board, each control point comprises at least two memory alloy layers and an elastic layer, the at least two memory alloy layers and the elastic layer of each control point are superposed and fixed in a one-to-one correspondence, each memory alloy layer is connected to two electrodes, and the two electrodes are located on the circuit board, and wherein, when a temperature of each memory alloy layer is lower than a specified threshold, all the control points are located on a first plane, and, when a temperature of a specified memory alloy layer is higher than the specified threshold, the specified memory alloy layer and the elastic layer are deformed, and a part of a control point corresponding to the specified memory alloy layer is protruded from the first plane;

a control circuit electrically connected to the sensing apparatus, wherein the control circuit comprises a plurality of groups of input/output interfaces, the two electrodes of each memory alloy layer are electrically connected to a group of input/output interfaces of the plurality of groups of input/output interfaces in a one-to-one correspondence, wherein the control circuit is configured to adjust an amount of electricity of one or more of the memory alloy layers, wherein the amount of electricity controls a temperature of the memory alloy layer, wherein the control circuit is configured to receive to-be-transmitted information, and control, based on the to-be-transmitted information, the amount of electricity of a memory alloy layer of a first control point, so that the memory alloy layer of the first control point vibrates, and wherein the control circuit is further configured to control that vibration frequencies of the at least two memory alloy layers of the first control point are different;

wherein the method comprises:

receiving the to-be-transmitted information;

generating control point control information based on the to-be-transmitted information; and inputting a periodic current to the memory alloy layer of the first control point based on the control point control information, to vibrate the memory alloy layer.

13. The control method according to claim 12, wherein a duty cycle of the periodic current satisfies:

$$D=t/(1/f)*100\%-n, \text{ wherein } t=Q/I^2R,$$

wherein D is the duty cycle of the periodic current, t is a power-on duration when the memory alloy layer is deformed, Q is a heat when the memory alloy layer is deformed, I is a current value input to the memory alloy layer, R is a resistance value of the memory alloy layer, f is a vibration frequency of the memory alloy layer, and n is an adjustment coefficient, and wherein $5\%\leq n\leq 10\%$.

14. The control method according to claim 12, wherein the control point control information comprises a sequence number of a control point, a vibration frequency of the control point, and a vibration duration of the control point.

15. The control method according to claim 12, wherein the to-be-transmitted information comprises depth information, and wherein the generating the control point control information based on the to-be-transmitted information comprises classifying a plurality of pieces of the depth information into N control intervals based on sizes of the plurality of pieces of the depth information, wherein $N\geq 2$, and wherein the inputting the periodic current to the memory alloy layer of the first control point based on the control point control information, to vibrate the memory alloy layer comprises inputting, based on the control point control information, the periodic current corresponding to a control interval to the memory alloy layer of the first control point, so that vibration frequencies of memory alloy layers corresponding to different control intervals are different.

16. The control method according to claim 15, wherein the vibration frequencies of the memory alloy layers comprise three levels, and wherein the vibration frequencies of the three levels are respectively between 1 Hz and 40 Hz, between 40 Hz and 60 Hz, and between 200 Hz and 300 Hz.

17. The control method according to claim 12, wherein the to-be-transmitted information comprises track information of a graph, wherein the generating the control point control information based on the to-be-transmitted information further comprises generating a vibration sequence of a control point based on the track information of the graph, and wherein the inputting the periodic current to the memory alloy layer of the first control point based on the control point control information, to vibrate the memory alloy layer further comprises sequentially inputting the periodic current to the memory alloy layer of the first control point based on the vibration sequence of the control point, to sequentially vibrate the memory alloy layer.

18. The control method according to claim 12, wherein the to-be-transmitted information further comprises character auxiliary information, and content of the character auxiliary information comprises color information, name information, quantity information, and/or position information, and wherein the generating the control point control information based on the to-be-transmitted information further comprises generating the control point control information based on the character auxiliary information.

* * * * *